(12) United States Patent
Laughner et al.

(10) Patent No.: US 6,455,638 B2
(45) Date of Patent: Sep. 24, 2002

(54) ETHYLENE/α-OLEFIN POLYMER BLENDS COMPRISING COMPONENTS WITH DIFFERING ETHYLENE CONTENTS

(75) Inventors: Michael K. Laughner; Deepak R. Parikh, both of Lake Jackson, TX (US); Christian Daniel, Thoiry (FR); M. Stephen Edmondson, Alvin, TX (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/849,203

(22) Filed: May 4, 2001

Related U.S. Application Data

(60) Provisional application No. 60/203,298, filed on May 11, 2000.

(51) Int. Cl.$^7$ .......................... C08L 9/00; C08L 23/00; C08L 23/04; C08L 25/02; C08L 45/00
(52) U.S. Cl. .................. 525/191; 525/210; 525/216; 525/232; 525/240; 525/241
(58) Field of Search ................. 525/191, 210, 525/216, 232, 240, 241

(56) References Cited

U.S. PATENT DOCUMENTS

| | | | |
|---|---|---|---|
| 4,429,079 A | 1/1984 | Shibata et al. | 525/240 |
| 4,438,238 A | 3/1984 | Fukushima et al. | 525/240 |
| 4,530,914 A | 7/1985 | Ewen et al. | 502/113 |
| 4,722,971 A | 2/1988 | Datta et al. | 525/211 |
| 4,874,820 A | 10/1989 | Cozewith et al. | 525/240 |
| 4,902,738 A | 2/1990 | Mitsuno et al. | 524/525 |
| 4,937,299 A | 6/1990 | Ewen et al. | 526/119 |
| 4,939,217 A | 7/1990 | Stricklen | 526/114 |
| 5,013,801 A | 5/1991 | Cozewith et al. | 526/64 |
| 5,064,802 A | 11/1991 | Stevens et al. | 502/155 |
| 5,236,998 A | 8/1993 | Lundeen et al. | 525/52 |
| 5,260,384 A | 11/1993 | Morimoto et al. | 525/240 |
| 5,292,845 A | 3/1994 | Kawasaki et al. | 526/336 |
| 5,338,589 A | 8/1994 | Böhm et al. | 428/36.9 |
| 5,382,631 A | 1/1995 | Stehling et al. | 525/240 |
| 5,438,100 A | 8/1995 | Shinozaki et al. | 525/240 |
| 5,464,905 A | 11/1995 | Tsutsui et al. | 525/240 |
| 5,476,903 A | 12/1995 | Shinozaki et al. | 525/232 |
| 5,478,890 A | 12/1995 | Shinozaki et al. | 525/240 |
| 5,494,965 A | 2/1996 | Harlin et al. | 525/52 |
| 5,539,076 A | 7/1996 | Nowlin et al. | 526/348.1 |
| 5,571,868 A | * 11/1996 | Datta et al. | 525/211 |
| 5,605,969 A | 2/1997 | Tsutsui et al. | 525/240 |
| 5,691,413 A | 11/1997 | Morikawa et al. | 525/99 |
| 5,703,180 A | 12/1997 | Tsutsui et al. | 526/119 |
| 5,728,766 A | 3/1998 | Schauder et al. | 524/496 |
| 5,744,551 A | 4/1998 | Kupperblatt et al. | 525/240 |
| 5,747,620 A | 5/1998 | Machida et al. | 526/348.3 |
| 5,798,427 A | 8/1998 | Foster et al. | 526/352 |

FOREIGN PATENT DOCUMENTS

| | | |
|---|---|---|
| WO | 93/13143 | 7/1993 |
| WO | 93/19104 | 9/1993 |
| WO | 94/00500 | 1/1994 |
| WO | 95/00526 | 1/1995 |
| WO | 95/14024 | 5/1995 |
| WO | 97/36942 | 10/1997 |
| WO | 98/49212 | 11/1998 |
| WO | 00/22014 | 4/2000 |
| WO | 00/26296 | 5/2000 |

OTHER PUBLICATIONS

Williams, T., et al., *The Construction of a Polyethylene Calibration Curve for Gel Permeation Chromatography Using Polystyrene Fractions*, Polymer Letters, vol. 6, pp. 621–624 (1968).

\* cited by examiner

*Primary Examiner*—Nathan M. Nutter
(74) *Attorney, Agent, or Firm*—Whyte Hirschboeck Dudek SC

(57) ABSTRACT

An ethylene/α-olefin polymer blend is described comprising first and second ethylene/α-olefin polymer components in which the ethylene content of the first component is at least 10 weight percent different than the ethylene content of the second component. These blends exhibit an improved combination of low temperature, pellet flow, compression set, melt strength and/or shape retention properties as compared to either component, or an ethylene/α-olefin polymer blend of similar composition but in which the ethylene content of each component is substantially the same.

10 Claims, 2 Drawing Sheets

ETHYLENE/α-OLEFIN POLYMER BLENDS COMPRISING COMPONENTS WITH DIFFERING ETHYLENE CONTENTS

This application claims priority from Provisional application Ser. No. 60/203,298, filed May 11, 2000.

FIELD OF THE INVENTION

This invention relates to ethylene/α-olefin polymer blends. In one aspect, this invention relates to polymer blends comprising two or more ethylene/α-olefin components while in another aspect, this invention relates to blends in which one or more of the components comprises an ethylene/α-olefin/polyene polymer. In yet another aspect, this invention relates to polymer blends of ethylene/α-olefin components in which the ethylene content of one component differs from the ethylene content of at least one other component by at least about 10 weight percent.

BACKGROUND OF THE INVENTION

Ethylene/α-olefin polymer blends are well known in the art. The blends taught in U.S. Pat. Nos. 4,438,238; 4,722,971; 4,874,820; 4,902,738; 4,937,299; 4,939,217; 5,013,801; 5,236,998; 5,292,845; 5,382,631; 5,494,965; 5,539,076; 5,691,413; 5,728,766; 4,429,079; 4,530,914; 5,605,969; 5,338,589; 5,260,384; 5,478,890; 5,438,100; 5,476,903; 5,703,180; 5,464,905; 5,744,551; 5,747,620 and 5,798,427 are representative, and each of these patents are incorporated herein by reference.

Blends are useful because they provide properties not available from the individual components from which the blend is made. For example, an ethylene/α-olefin polymer with a relatively narrow molecular weight distribution (MWD), e.g., 2 or less, will usually produce a film with good transparency but it will usually process less efficiently than an ethylene/α-olefin polymer alike in all aspects except with a MWD of 3 or more. However, an ethylene/α-olefin polymer with a MWD of 3 or more usually produces a film that is less transparent than a like ethylene/α-olefin polymer with a MWD of 2 or less. Blending the two polymers will usually produce a composition that will produce a film with both desirable transparency and processability. Moreover, depending upon the particular ethylene/α-olefin polymers, the relative proportions of each, the manner in which the polymers are made and/or blended, the properties of interest and a host of other variables, one or more properties of the blend may be more than a simple average of its component parts.

While ethylene/α-olefin polymer blends can be prepared by any one of a number of different processes, generally these processes fall into one of two categories, i.e., post-reactor blending and in-reactor blending. Illustrative of the former are melt extruders into which two or more solid ethylene/α-olefin polymers are fed and physically mixed into a substantially homogeneous composition, and multiple solution, slurry or gas-phase reactors arranged in a parallel array the output from each blended with one another to form a substantially homogeneous composition which is ultimately recovered in solid form. Illustrative of the latter are multiple reactors connected in series, and single reactors charged with two or more catalysts. While each general process category has its own advantages and disadvantages, in-reactor blending is a favored technique for making blends in which component compatibility, i.e., the ability to make a substantially homogeneous blend from the components, is a factor. Generally, forming a substantially homogeneous blend from ethylene/α-olefin polymer components that are less than fully compatible is easier and more successful and cost effective using an in-reactor technique than a post-reactor technique, particularly melt extrusion.

Ethylene/α-olefin polymers and blends of these materials are commercially important because they exhibit and/or impart desirable properties to various products, e.g., films and molded and extruded articles. Properties of frequent interest are low temperature impact strength, compression set, melt strength, shape retention, pellet flow, mechanical strengths and modulus. Depending upon the end use, often one or more of these properties will be more important than the others. Enhancement of these more important properties often requires the use of a blend of ethylene/α-olefin polymers. The industry interest, of course, is in blends in which the properties of primary importance are enhanced without significant diminution of the other properties.

SUMMARY OF THE INVENTION

According to this invention, ethylene/α-olefin polymer blends with improved low temperature, pellet flow, compression set, melt strength and/or shape retention properties are prepared by blending a first ethylene/α-olefin polymer component with a second ethylene/α-olefin polymer component, with the proviso that the ethylene content of the first and second ethylene/α-olefin polymer components differ from one another by at least about 10 weight percent. The blends can be made by either post-reactor or in-reactor blending, and the weight ratio of first component to second component can vary widely, typically from between 80:20 to 20:80. One hallmark of this invention is that the enhanced properties of the blend are achieved without significant diminution of other desirable properties of the blend components.

DETAILED DESCRIPTION OF THE INVENTION

Figure 1:
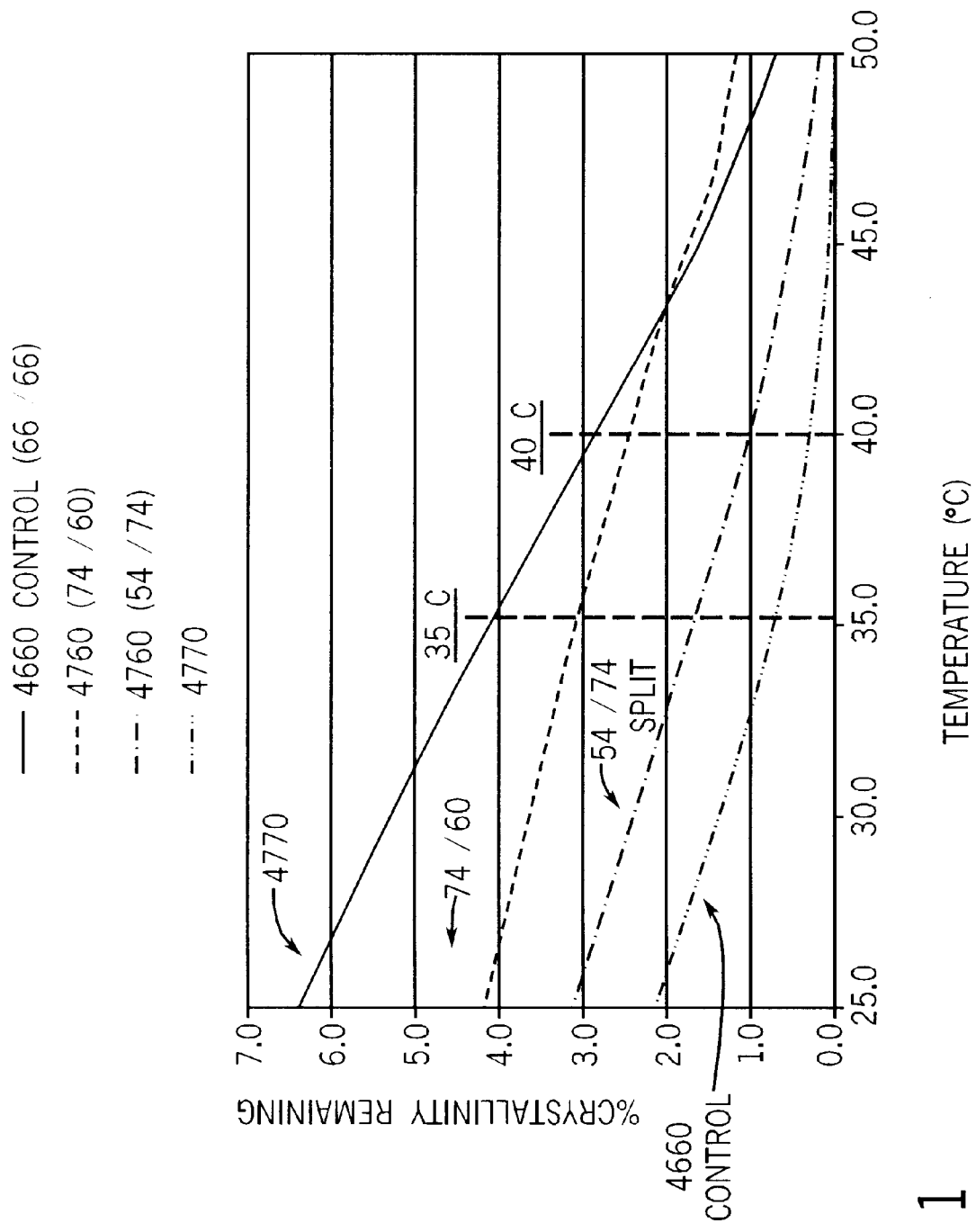
FIG. 1 is a graph reporting the residual crystallinity of exemplary elastomer blends of this invention as compared to a control elastomer.

The ethylene/α-olefin blend components of this invention are polymers, i.e., interpolymers, of ethylene with at least one $C_3$–$C_{20}$ α-olefin (preferably an aliphatic α-olefin) comonomer, and/or a polyene comonomer, e.g., a conjugated diene, a nonconjugated diene, a triene, etc. The term interpolymer includes copolymers, e.g. ethylene/propylene (EP), and terpolymers, e.g. EPDM, but it is not limited to polymers made with only ethylene and one or two monomers. Examples of the $C_3$–$C_{20}$ α-olefins include propene, 1-butene, 4-methyl-1-pentene, 1-hexene, 1-octene, 1-decene, 1-dodecene, 1-tetradecene, 1-hexadecene, 1-octadecene and 1-eicosene. The α-olefin can also contain a cyclic structure such as cyclohexane or cyclopentane, resulting in an α-olefin such as 3-cyclohexyl-1-propene (allyl-cyclohexane) and vinyl-cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (e.g., α-methylstyrene, etc.) are α-olefins for purposes of this invention.

Polyenes are unsaturated aliphatic or alicyclic compounds containing more than four carbon atoms in a molecular chain and having at least two double and/or triple bonds, e.g., conjugated and nonconjugated dienes and trienes. Examples of nonconjugated dienes include aliphatic dienes such as 1,4-pentadiene, 1,4-hexadiene, 1,5-hexadiene, 2-methyl-1, 5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene, 5-vinyl-2-norbornene and 7-methyl-1,6-octadiene preferred nonconjugated dienes.

Examples of conjugated dienes include butadiene, isoprene, 2,3-dimethylbutadiene-1,3,1,2-dimethylbutadiene-1,3,1,4-dimethylbutadiene-1,3,1-ethylbutadiene-1,3,2-phenylbutadiene-1,3, hexadiene-1,3,4-methylpentadiene-1,3,1,3-pentadiene ($CH_3CH=CH-CH=CH_2$; commonly called piperylene), 3-methyl-1,3-pentadiene, 2,4-dimethyl-1,3-pentadiene, 3-ethyl-1,3-pentadiene, and the like; with 1,3-pentadiene a preferred conjugated diene.

Examples of trienes include 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary copolymers include ethylene/propylene, ethylene/butene, ethylene/1-octene, ethylene/5-ethylidene-2-norbornene, ethylene/5-vinyl-2-norbornene, ethylene/-1, 7-octadiene, ethylene/7-methyl-1,6-octadiene and ethylene/1,3,5-hexatriene. Exemplary terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include ethylene/propylene/1-octene/diene (e.g. ENB), ethylene/butene/1-octene/diene and ethylene/propylene/mixed dienes, e.g. ethylene/propylene/5-ethylidene-2-norbornene/piperylene. In addition, the blend components can include minor amounts, e.g. 0.05–0.5 percent by weight, of long chain branch enhancers, such as 2,5-norbornadiene (aka bicyclo[2,2,1] hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

Typically, the blend components of this invention comprise at least about 20, preferably at least about 30 and more preferably at least about 40, weight percent ethylene; at least about 1, preferably at least about 5 and more preferably at least about 10, weight percent of at least one α-olefin; and, if a polyene-containing terpolymer, greater than 0, preferably at least about 0.1 and more preferably at least about 0.5, weight percent of at least one conjugated or nonconjugated polyene. As a general maximum, the blend components of this invention comprise not more than about 95, preferably not more than about 85 and more preferably not more than about 75, weight percent ethylene; not more than about 80, preferably not more than about 70 and more preferably not more than about 60, weight percent of at least one α-olefin; and, if a terpolymer, not more than about 20, preferably not more than about 15 and more preferably not more than about 12, weight percent of at least one of a conjugated or nonconjugated diene. All weight percentages are based on weight of the blend.

Important to this invention is that the difference in ethylene content between the first and second components of the blend is at least about 10 weight percent, preferably at least about 15 and more preferably at least about 20, weight percent. The maximum difference in ethylene content between the first and second components of the blend can vary widely although as a practical matter, the maximum difference does not exceed about 30, preferably about 25, weight percent.

The ethylene/α-olefin polymer components of this invention can be produced using conventional ethylene/α-olefin polymerization technology. Preferably, the ethylene/α-olefin polymer components of this invention are made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. The catalyst is preferably mono-cyclopentadienyl, mono-indenyl or mono-fluorenyl CGCs. The solution process is preferred. U.S. Pat. No. 5,064,802; WO93/19104 (U.S. Ser. No. 8,003, filed Jan. 21, 1993), and WO95/00526 disclose constrained geometry metal complexes and methods for their preparation. Variously substituted indenyl containing metal complexes are taught in WO95/14024 and WO98/49212. The relevant teachings of all of the foregoing patents or their corresponding U.S. patents or allowed applications are hereby incorporated by reference for purposes of U.S. patent practice.

In general, polymerization may be accomplished at conditions well known in the art for Ziegler-Natta or Kaminsky-Sinn type polymerization reactions, that is, temperatures from 0–250° C., preferably 30–200° C., and pressures from atmospheric to 10,000 atmospheres (1013 megapascals (MPa)). Suspension, solution, slurry, gas phase, solid state powder polymerization or other process conditions may be employed if desired. A support, especially silica, alumina, or a polymer (especially poly(tetrafluoroethylene) or a polyolefin) may be employed, and desirably is employed when the catalyst is used in a gas phase polymerization process. The support is preferably employed in an amount sufficient to provide a weight ratio of catalyst (based on metal):support within a range of from 1:100,000 to 1:10, more preferably from 1:50,000 to 1:20, and most preferably from 1:10,000 to 1:30. In most polymerization reactions, the molar ratio of catalyst:polymerizable compounds employed is from $10^{-12}:1$ to $10^{-1}:1$, more preferably from $10^{-9}:1$ to $10^{-5}:1$.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 1-hexane, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The ethylene/α-olefin polymer components of this invention can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of processes that can be use to form the blends of this invention include the use of an ethylene/α-olefin polymerization catalyst utilized in combination with at least one additional homogeneous or heterogeneous polymerization catalyst in the same reactor or in separate reactors that are connected in series or in parallel to prepare polymer blends having desirable properties. An example of such a process is disclosed in WO 94/00500 at page 29 line 4 to page 33 line 17. The process uses a continuously stirred tank reactor (CSTR) connected in series or parallel to at least one other CSTR or tank reactor. WO 93/13143 (at page 2 lines 19–31) teaches polymerizing monomers in a first reactor using a first CGC having a first reactivity and polymerizing monomers in a second reactor using a second CGC having a second reactivity and combining the products from the two reactors. Page 3, lines 25–32 of WO 93/13143 provides teachings about the use of two CGCs having different reactivities in one reactor. WO 97/36942 (page 4 line 30 through page 6 line 7) teaches the use of a two-loop reactor system. The relevant teachings of such applications or their corresponding U.S. patents and allowed applications are incorporated herein by reference for purposes of U.S. patent practice.

The polydispersity (molecular weight distribution or Mw/Mn or MWD) of the polymer blend generally ranges from at least about 2, preferably at least about 2.1, and especially at least about 2.2 to about 10, preferably about 6, and especially about 4.

The polydispersity index is typically measured by gel permeation chromatography (GPC) on a Waters 150° C. high temperature chromatographic unit equipped with three linear mixed bed columns (Polymer Laboratories (10 micron particle size)) operating at a system temperature of 140° C. The solvent is 1,2,4-trichlorobenzene from which about 0.5% by weight solutions of the samples are prepared for injection. The flow rate is 1.0 milliliter/minute, and the injection size is 100 microliters.

The molecular weight determination is deduced by using narrow molecular weight distribution polystyrene standards (from Polymer Laboratories) in conjunction with their elusion volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the equation:

$$M_{polyethylene} = (a)(M_{polystyrene})^b$$

In this equation, a=0.4316 and b=1.0. Weight average molecular weight, Mw, is calculated in the usual manner according to the formula:

$$Mw = \Sigma(w_i)(M_i)$$

where $w_i$ and $M_i$ are the weight fraction and molecular weight respectively of the $i^{th}$ fraction eluting from the GPC column. Generally, the Mw of the polymer blend ranges from about 10,000, preferably about 20,000, more preferably about 40,000, and especially about 60,000, to about 1,000,000, preferably about 800,000, more preferably about 600,000, and especially about 500,000.

The polymer blends of this invention cover a range of viscosities, depending upon the molecular weight of the blend and optional post-polymerization rheological modification. In general, the blend viscosity is characterized by a Mooney viscosity which is measured according to ASTM D 1646-89 using a shear rheometer at 125° C. The polymer blend Mooney viscosity generally ranges from a minimum of less than 0.01, preferably 0.1, more preferably about 1, and especially about 15 to a maximum of about 150, preferably about 125, more preferably about 100, and especially about 70.

The rheological or shear thinning behavior of the ethylene interpolymer is determined by measuring the ratio of interpolymer viscosity at 0.1 rad/sec to viscosity at 100 rad/sec. This ratio is known as the Rheology Ratio (RR), V0.1/V100, or more simply, 0.1/100. The RR is an extension of $I_{10}/I_2$ and as such, in those instances in which the measurement of $I_2$ and $I_{10}$ are difficult, e.g., the $I_2$ is less than 0.5, or the molecular weight of the interpolymer is relatively high, or the Mooney viscosity of the interpolymer is greater than about 35, the RR of the interpolymer can be measured using a parallel plate rheometer.

The density of the polymer blends is measured according to ASTM D-792, and this density ranges from a minimum of about 0.850 grams/cubic centimeter ($g/cm^3$), preferably about 0.853 $g/cm^3$, and especially about 0.855 $g/cm^3$, to a maximum of about 0.970 $g/cm^3$, preferably about 0.940 $g/cm^3$, and especially about 0.930 $g/cm^3$. For those polymer blends that are elastomers, i.e., with a crystallinity less than about 45%, the maximum density is about 0.895, preferably about 0.885 and more preferably 0.875, $g/cm^3$.

For polymer blends intended for use as elastomers, the crystallinity is preferably less than about 40, more preferably less than about 30, percent, preferably in combination with a melting point of less than about 115, preferably less than about 105, C, respectively. Elastomeric polymer blends with a crystallinity of zero to 25 percent are even more preferred. The percent crystallinity is determined by dividing the heat of fusion as determined by differential scanning calorimetry (DSC) a of polymer blend sample by the total heat of fusion for that polymer blend sample. The total heat of fusion for high-density homopolymer polyethylene (100% crystalline) is 292 joule/gram (J/g).

One hallmark of this invention is that a desirable property of one component of the blend can be enhanced without a significant diminution of one or more desirable properties of another component. For example, certain blends of this invention exhibit an enhanced low temperature impact property relative to one component of the blend without any significant diminution of the glass transition temperature (Tg) of the other component of the blend. Other blends of this invention exhibit the same phenomena (i.e., no significant diminution of Tg) with respect to pellet flow (i.e., the ability of pellets made from the blend to move pass one another without sticking or blocking), compression set for a given crystallinity, melt strength and shape retention.

Another hallmark of this invention is that these blends exhibit an improved combination of low temperature, pellet flow, compression set, melt strength and/or shape retention properties as compared to an ethylene/α-olefin polymer blend of similar composition but in which the ethylene content of each component is substantially the same.

The following examples are provided as a further illustration of the invention. Unless stated to the contrary, all parts and percentages are by weight.

SPECIFIC EMBODIMENT

Four elastomers were prepared using a dual loop reactor such as that described in WO 98/49212. Each elastomers was prepared under the same conditions with the same reactants and catalyst and to the same total ethylene content (66 weight percent based upon the weight of the polymer component) as the other elastomers. The control elastomer was a blend of two essentially identical components, i.e., the component made in the first loop reactor was essentially the same in composition and properties as the component made in the second loop reactor. The remaining three elastomers, i.e., Elastomers 1, 2 and 3, are embodiments of this invention. Each is essentially the same as the other and the control except that the ethylene content of the component made in the first loop reactor is different than the ethylene content of the component made in the second loop reactor. The composition, Mooney viscosity, weight average molecular weight (Mw), molecular weight distribution (MWD), temperature of crystallinity (Tc, both onset and peak), and glass transition temperature (Tg) for each elastomer and two commercially available elastomers (Dutral™ 4038 manufactured and sold by Enichem, and Nordel™ IP 4770 manufactured and sold by Dupont Dow Elastomers) are reported in the following table.

Although the invention has been described in considerable detail through the specification and examples, one skilled in the art can make many variations and modifications without departing from the spirit and scope of the invention as described in the following claims.

What is claimed is:

1. An ethylene/α-olefin polymer blend comprising first and second ethylene/α-olefin polymer components in which the ethylene content of the first component differs by at least about 10 weight percent from the ethylene content of the second component.

2. The blend of claim 1 in which the ethylene content of the first component differs by at least about 15 weight percent from the ethylene content of the second component.

3. The blend of claim 1 in which the α-olefin in each component contains from 3 to about 8 carbon atoms.

4. The blend of claim 3 in which the α-olefin in each component is propylene.

5. The blend of claim 4 in which the first and second ethylene/α-olefin polymer components further comprise a polyene.

6. The blend of claim 5 in which the polyene is 5-ethylidene-2-norbornene.

7. The blend of claim 3 in which the α-olefin in the first component is propylene and the α-olefin in the second component contains from 4 to 8 carbon atoms.

8. The blend of claim 7 in which at least one of the first and second ethylene/α-olefin polymer components further comprises a polyene.

Physical Properties of Two Commercial Elastomers, One Control Elastomer, and Three Elastomers with a Split Ethylene Composition

| Description | Nordel ™ IP 4770 | Dutral ™ 4038 | Control 66/66 | Elastomer 1 74/60 | Elastomer 2 54/74 | Elastomer 3 48/78 |
|---|---|---|---|---|---|---|
| Mooney | 70 | 62 | 63.2 | 58 | 59 | 64 |
| Ethylene | 70.0 | 70.6 | 66.9 | 67.3 | 66.8 | 67.4 |
| Propylene | 25.1 | 24.4 | 28.2 | 28.1 | 28.4 | 27.7 |
| ENB | 4.9 | 5.0 | 4.91 | 4.66 | 4.82 | 4.9 |
| Mw | 196,700 | 180,000 | 179,700 | 177,800 | 184,000 | 185,800 |
| MWD | 2.8 | 2.71 | 2.92 | 2.9 | 2.34 | 2.93 |
| Tc Onset | 29.36 | 24.40 | 16.78 | 38.46 | 22.95 | 30.94 |
| Tc Peak | 23.23 | 16.70 | 10.46 | 27.06 | 13.54 | 21.20 |
| Tg | −37.00 | −40.96 | −42.93 | −43.1 | −43.10 | −44.98 |

As is evident from the data in the above table, Elastomers 1, 2 and 3 not only have a lower Tg than the control elastomer, but also a lower Tg than the two commercially available elastomers (both of similar composition). Lower Tg usually means better low temperature flexibility in such products as seals, belts and automotive hoses.

The residual crystallinity at elevated temperatures of Elastomers 1, 2 and 3 are compared with the Control Elastomer in FIG. 1. As can be seen from this graph, as the ethylene split between the elastomer components increases, the so does the residual crystallinity. Usually, the larger the residual crystallinity at higher temperatures, the better the shape retention of the elastomer (neat or deployed in its intended end-use).

Figure 2:
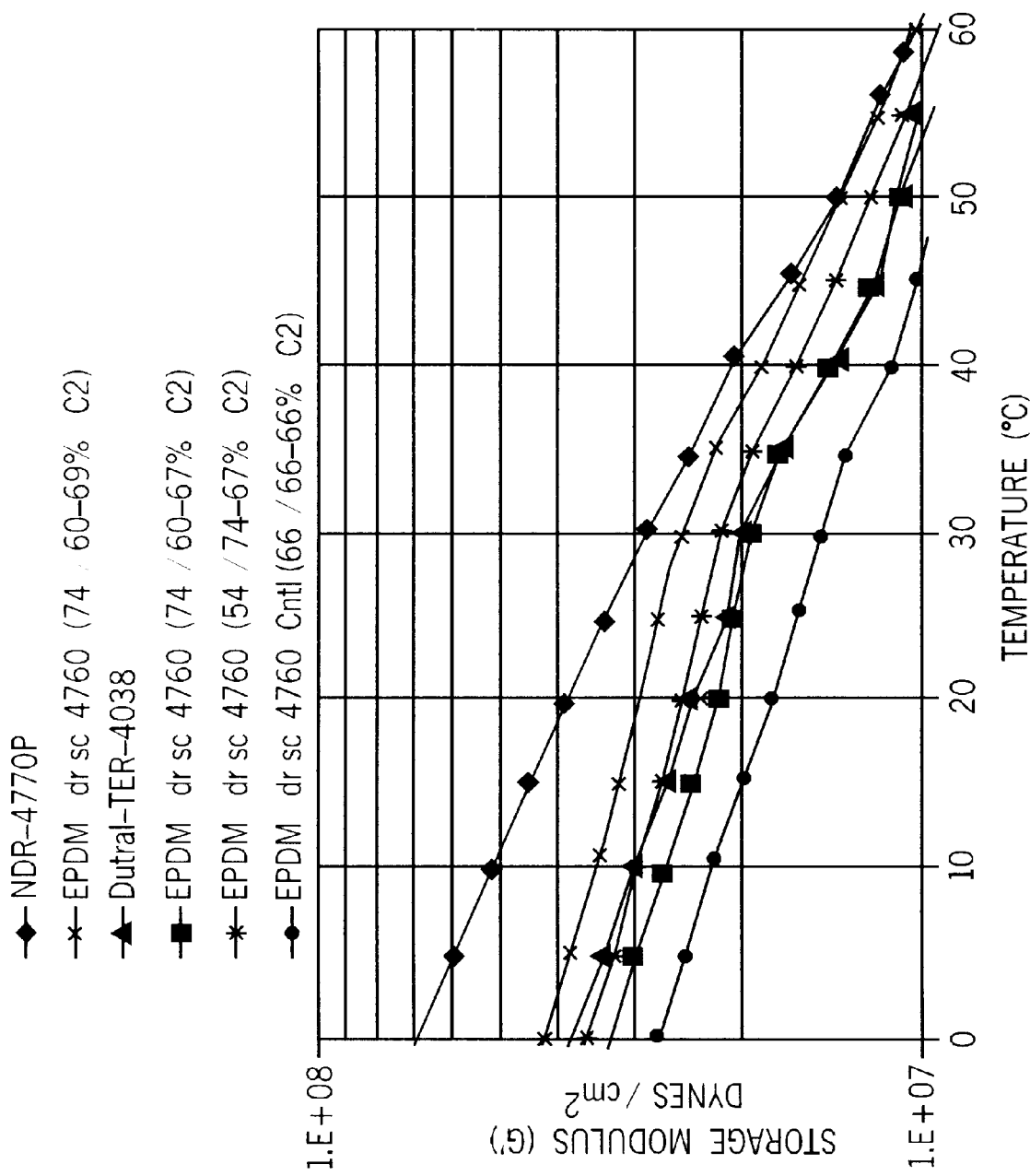
FIG. 2 is a graph reporting the modulus G' of exemplary elastomer blends of this invention as compared to a control elastomer and two commercially available elastomers.

FIG. 2 reports the modulus G' of the Control Elastomer, Elastomers 1, 2 and 3, Nordel IP 4770 and Dutral 4038. Modulus G3', or storage modulus, is another measure of the shape retention of the elastomer. Here too, Elastomers 1, 2 and 3 outperform the Control Elastomer even with a slightly higher overall ethylene content.

Finally, Elastomers 1 and 2 were compared with the Control Elastomer for pellet flow. Elastomers 1 and 2 demonstrated superior temperature resiliency and lower blocking than the Control Elastomer.

9. An ethylene/(α-olefin polymer blend comprising first and second ethylene/α-olefin polymer components, the blend prepared by (i) contacting ethylene, an α-olefin, an activated constrained geometry catalyst and, optionally, a polyene, under polymerization conditions, in a first reactor to produce the first ethylene/α-olefin polymer component, (ii) transferring the first ethylene/α-olefin polymer component to a second reactor and in the presence of the first ethylene/α-olefin polymer component, (iii) contacting fresh ethylene, an α-olefin, an activated constrained geometry catalyst and, optionally, a polyene, under polymerization conditions to produce the second ethylene/α-olefin polymer component, the polymerizations of the first and second reactors conduct in such a manner that the ethylene content of the first ethylene/α-olefin polymer component is at least 10 weight percent different than the ethylene content of the second ethylene/α-olefin polymer component.

10. The blend of claim 9 in which the polymerization conducted in each reactor is a solution phase polymerization.

* * * * *

UNITED STATES PATENT AND TRADEMARK OFFICE
CERTIFICATE OF CORRECTION

PATENT NO. : 6,455,638 B2
DATED : September 24, 2002
INVENTOR(S) : Michael K. Laughner et al.

It is certified that error appears in the above-identified patent and that said Letters Patent is hereby corrected as shown below:

<u>Column 7,</u>
Lines 31-43, delete the table and replace it with:

Physical Properties of Two Commercial Elastomers, One Control Elastomer, and Three Elastomers with a Split Ethylene Composition

| Description | Nordel™ IP 4770 | Dutral™ 4038 | Control | Elastomer 1 | Elastomer 2 | Elastomer 3 |
|---|---|---|---|---|---|---|
|  |  |  | 66/66 | 74/60 | 54/74 | 48/78 |
| Mooney | 70 | 62 | 63.2 | 58 | 59 | 64 |
| Ethylene | 70.0 | 70.6 | 66.9 | 67.3 | 66.8 | 67.4 |
| Propylene | 25.1 | 24.4 | 28.2 | 28.1 | 28.4 | 27.7 |
| ENB | 4.9 | 5.0 | 4.91 | 4.66 | 4.82 | 4.9 |
| Mw | 196,700 | 180,000 | 179,700 | 177,800 | 184,000 | 185,800 |
| MWD | 2.8 | 2.71 | 2.92 | 2.9 | 2.34 | 2.93 |
| Tc Onset | 29.36 | 24.40 | 16.78 | 38.46 | 22.95 | 30.94 |
| Tc Peak | 23.23 | 16.70 | 10.46 | 27.06 | 13.54 | 21.20 |
| Tg | -37.00 | -40.96 | -42.93 | -43.1 | -43.10 | -44.98 |

Line 61, replace " G3' " with -- G' --

<u>Column 8,</u>
Line 46, replace "ethylene/(α-olefin" with -- ethylene/α-olefin --.

Signed and Sealed this

First Day of July, 2003

JAMES E. ROGAN
*Director of the United States Patent and Trademark Office*

(12) EX PARTE REEXAMINATION CERTIFICATE (6602nd)
United States Patent
Laughner et al.

(10) Number: US 6,455,638 C1
(45) Certificate Issued: Jan. 6, 2009

(54) ETHYLENE/α-OLEFIN POLYMER BLENDS COMPRISING COMPONENTS WITH DIFFERING ETHYLENE CONTENTS

(75) Inventors: Michael K. Laughner, Lake Jackson, TX (US); Deepak R. Parikh, Lake Jackson, TX (US); Christian Daniel, Thoiry (FR); M. Stephen Edmondson, Alvin, TX (US)

(73) Assignee: Dow Global Technologies Inc., Midland, MI (US)

Reexamination Request:
No. 90/007,837, Dec. 6, 2005

Reexamination Certificate for:
Patent No.: 6,455,638
Issued: Sep. 24, 2002
Appl. No.: 09/849,203
Filed: May 4, 2001

Certificate of Correction issued Jul. 1, 2003.

Related U.S. Application Data

(60) Provisional application No. 60/203,298, filed on May 11, 2000.

(51) Int. Cl.
*C08F 210/00* (2006.01)
*C08F 210/018* (2006.01)
*C08L 023/00* (2006.01)
*C08L 023/016* (2006.01)

(52) U.S. Cl. .................. 525/191; 525/210; 525/216; 525/232; 525/240; 525/241

(58) Field of Classification Search .................. None
See application file for complete search history.

(56) References Cited

U.S. PATENT DOCUMENTS

| 4,245,062 A | 1/1981 | Suzuki et al. |
|---|---|---|
| 4,981,900 A | 1/1991 | Sugawara |
| 6,538,070 B1 * | 3/2003 | Cardwell et al. ............ 525/240 |

FOREIGN PATENT DOCUMENTS

| CA | 2319778 A1 | 9/1999 |
|---|---|---|
| CA | 2336816 A1 | 1/2000 |
| CA | 2372056 A1 | 11/2000 |
| CA | 2349297 A1 | 3/2001 |
| EP | 0515898 A2 | 5/1992 |
| JP | 9169878 | 6/1997 |

* cited by examiner

*Primary Examiner*—Jerry D. Johnson

(57) ABSTRACT

An ethylene/α-olefin polymer blend is described comprising first and second ethylene/α-olefin polymer components in which the ethylene content of the first component is at least 10 weight percent different than the ethylene content of the second component. These blends exhibit an improved combination of low temperature, pellet flow, compression set, melt strength and/or shape retention properties as compared to either component, or an ethylene/α-olefin polymer blend of similar composition but in which the ethylene content of each component is substantially the same.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

* * * * *